Sept. 15, 1970      J. L. MAYNARD      3,528,292

LONG LIFE THERMOMETER

Filed July 2, 1968

INVENTOR.
John L. Maynard

BY

Paul & Paul

ATTORNEYS.

United States Patent Office 3,528,292
Patented Sept. 15, 1970

3,528,292
LONG LIFE THERMOMETER
John L. Maynard, Willingboro, N.J., assignor to Medical Devices Company, Inc., Willingboro, N.J., a company of New Jersey
Filed July 2, 1968, Ser. No. 742,009
Int. Cl. G01k 1/08
U.S. Cl. 73—374      4 Claims

ABSTRACT OF THE DISCLOSURE

A thermometer is provided having a resilient grip at one end, which, besides functioning as a grip for purposes of shaking the thermometer, also functions as a seal for seating the thermometer within a package, with the grip being engaged with an open end of the package. The thermometer may be provided with a transparent rubber coating for precluding shattering as well as breakage. A bubble package is provided for the thermometer, comprising a bubble member secured to a backing member, with one end of the bubble member being removable for insertion of the thermometer therein with its grip seated in the open end of the package, as for example when the package is hung with the thermometer disposed vertically.

BACKGROUND OF THE INVENTION

In the thermometer art, very little development has been effected, and even this has not been exploited to pass on to users of the thermometer improvements which will retard or preclude the breakage of thermometers which is commonplace with the usual glass-mercury thermometer.

In this regard, some attempts have been made to provide sheaths or the like for covering a thermometer and providing a means whereby a thermometer may be grasped and shaken down, but generally the material of construction of such sheaths required their removal prior to use of the thermometer due to the inability of such material to provide desired heat-transmitting qualities.

Also, the conventional thermometer is grasped at one end and then shaken vigorously to bring the mercury in the capillary tube down toward the bulb generally below a temperature reading of 94° (for most medical thermometers), quite often resulting in a situation whereby the vigorous shaking actually shakes the thermometer from the fingers of a user, onto the floor whereby breakage and shattering of the thermometer results. Particularly, this is highly disadvantageous in a hospital atmosphere or the like, wherein the thermometer shattering may be effected, for example, on a tile floor, such that numerous particles of glass and the like are strewn over the floor resulting in a highly dangerous condition.

Still further, thermometers are conventionally provided in encasing structures for storage, such structures generally containing the thermometer under substantially unsterile conditions, requiring a washing of the thermometer before and after each use with an antiseptic, generally alcohol. Such practice is often cumbersome in that the thermometer is not instantaneously ready for use when desired.

SUMMARY OF INVENTION

The present invention seeks to provide a solution to the above-enumerated and other disadvantageous features of conventional thermometers and thermometer packages in providing a novel thermometer and a packaging device therefor, having novel features specifically designed to eliminate the above and other undesirable features of prior art thermometers.

Specifically, a novel coating is applied to the glass thermometer, the coating being substantially completely transparent and a novel grip is applied to one end of the thermometer, the grip being specifically configured against slippage of the thermometer from the hand of a user during "shaking-down" of the thermometer. The grip is also designed for insertion into a container for seating and sealing the thermometer under sterile conditions within its package or container. The thermometer package includes a backing member and a bubble member, for substantially encasing the thermometer when sold as a unit, but wherein one end of the bubble member is removable for access to the thermometer, leaving an open end of the bubble for seating the grip portion of the thermometer therein. Once the package is opened, the hollow generally tubular void formed by the bubble member adhered to the backing member may be partially or completely filled with an antiseptic, such as alcohol or the like, for insertion of the thermometer therein and retention of the thermometer therein between uses. Thus, the thermometer would be ready for use at all times, with the grip functioning as a seal against bacteria and the like in the environment of the thermometer.

Accordingly, it is a primary object of this invention to provide a thermometer having a novel grip at one end thereof, either with or without a clear, resilient coating for the thermometer.

It is another object of this invention to provide a novel thermometer, wherein the grip is particularly configured to provide a sealing and seating arrangement with a container therefor.

It is a further object of this invention to provide a thermometer according to any of the objects set forth above, wherein the grip also provides a seating arrangement within its container, the container generally being constructed for disposition with the thermometer contained therein in a vertical position, for gravity seating of the thermometer therein.

It is a further object of this invention to provide a thermometer and package combination, wherein the thermometer is encased between a backing member and a bubble member, the bubble member preferably being transparent and wherein one end of the bubble member is removable for providing an access opening of the therometer therein, with a grip portion at one end of the thermometer being engageable with the open end of the bubble.

It is yet a further object of this invention to provide a novel thermometer package wherein two pieces of polyvinylchloride, one opaque and the other transparent, are solvent-sealed together with methylene chloride as a solvent, to form a monolithic structure that is completely inert to common antiseptic.

Other objects and advantages of the present invention will be readily apparent to those skilled in the art from the following brief description of the drawing figures, detailed description of the preferred embodiment and the appended claims.

IN THE DRAWINGS

FIG. 2 is a view generally similar to that of FIG. 1, but wherein an upper portion of the transparent bubble portion of the thermometer package has been removed, leaving the thermometer and the remainder of its package in the form in which it would ordinarily be used and retained in a household, hospital or the like.

Figure 1:
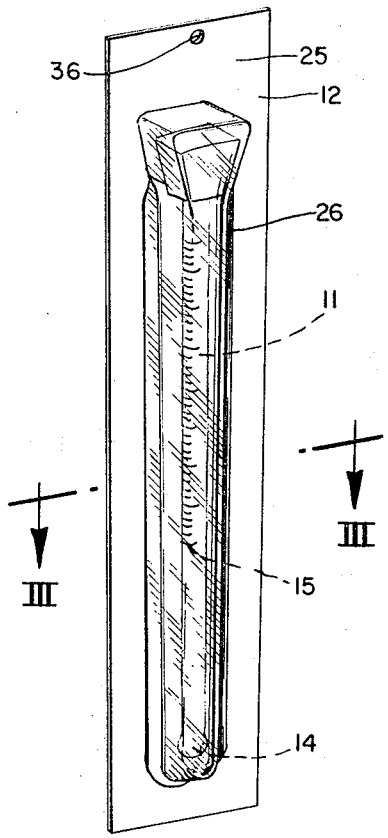
FIG. 1 is a front perspective view of the thermometer and its packaging arrangement of this invention, disposed vertically, and in the form in which the structure may be sold commercially.

Referring now to the drawings in detail, reference is first made to FIG. 1, wherein there is illustrated the thermometer and package structure of this invention, generally designated by the numeral 10.

Figure 3:
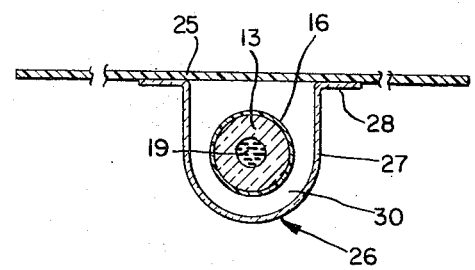
FIG. 3 is an enlarged transverse cross-sectional view of the thermometer and package of this invention, taken generally along the line III—III of FIG. 1, and wherein the particular details of construction of the thermometer and its coating are illustrated, along with the manner of attachment of the two package components to each other.

The structure 10 includes a thermometer 11 and its package 12. The thermometer 11 comprises an elongated tubular member 13, generally of glass construction or the like, having a longitudinal void therein (not illustrated), the longitudinal void comprising a capillary tube for expansion of mercury as shown at 19 in FIG. 3 or like temperature responsive substance therein, a supply of such mercury or the like normally being retained within a bulb 14 of the thermometer 11.

The thermometer 11 is generally provided with indicia 15 thereon, for indicating temperature readings. Although this invention is not limited to medical thermometers, for taking the temperature of human beings and the like, the temperature scale will ordinarily range from 94° F. to 108° F.

The thermometer is coated with a transparent substance for lending some resilience to the thermometer, such coating extending substantially completely over the exposed glass portion 13 of the thermometer and over the bulb portion 14. A resilient transparent coating of this type allows visual observation of the travel of mercury within its capillary tube, but prevents shattering when the thermometer is dropped, and even retards breakage when the thermometer is dropped. However, in many instances breakage will still occur, but shattering will not. The particular coating 16 comprises a silicone base room temperature curing rubber. A particularly satisfactory mixture may comprise twenty-five percent of a substance sold commercially as General Electric type RTV108 and seventy-five percent chlorothene NU. The manner of application of such a coating may be adhered to the thermometer either by dipping or spraying, as desired.

The thermometer 11 includes a protrusion member comprising a grip portion 17 protruding laterally at its upper end, the grip portion being constructed generally of a rubber-like material such as resilient rubber or epoxy material as desired, and preferably completely covering one end and an upper-most portion of the thermometer side walls 18.

Figure 2:
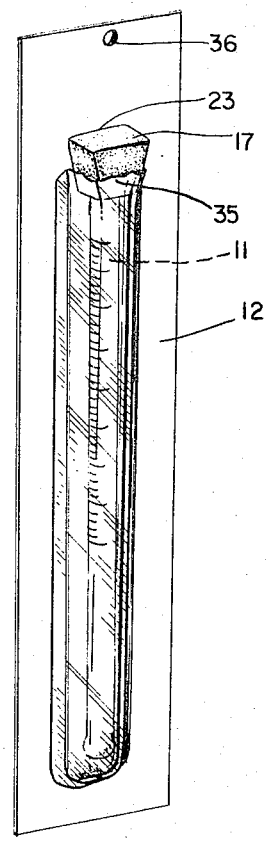
Figure 4:
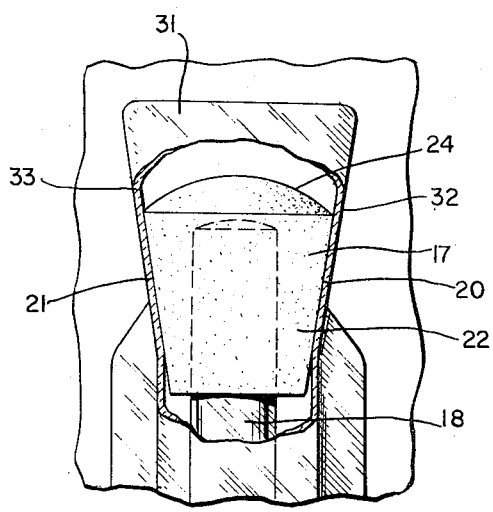
FIG. 4 is an enlarged fragmentary front view of the upper end of the upper portion of the thermometer and package arrangement of FIG. 1, wherein a portion of the bubble portion of the package is broken away for illustrating the seating arrangement of the thermometer grip portion within the upper end of the thermometer package.

The grip portion 17 has opposite sides 20 and 21 which tend to converge toward each other in the direction of the lower end of the thermometer 11, as viewed in FIGS. 1, 2 and 4 of the drawings, or toward a generally trapezoidal configuration as illustrated by the sides 20 and 21 of the portion 17 in FIG. 4. Also, the front and rear portions 22 and 23, respectively, of the grip portion 17 of the thermometer 11 may also tend to converge in a direction toward the lower end of the thermometer 11, when viewed from either side of the thermometer 11. The uppermost end 24 of the grip portion 17 of the thermometer 11 may be crowned as illustrated in FIG. 4, if desired. Particularly, it is to be noted that the general shape of the grip portion 17 of the thermometer toward convergence in the direction of the lower end of the thermometer permits grasping of the thermometer between fingers of the user for "shaking-down" purposes, for precluding accidental slippage of the thermometer 11 from the hand of a user. It is conceivable that other specific configurations for the grip portion 17 may be desirable, such as a grip portion of generally circular transverse cross-sectional configuration and of frustoconical three dimensional configuration, with the largest diameter portion of the grip portion being at the upper end of the grip portion. Such a configuration would also provide many of the desirable grip-retention qualities of a thermometer 11.

A package 12 is also provided, comprising a generally rectangular backing sheet 25 of polyvinylchloride material in sheet form, and preferably being opaque. A bubble member 26, also of polyvinylchloride material, but being transparent is provided, and conforms generally to the configuration of the thermometer 11, as viewed in FIG. 1, but being substantially larger than the thermometer 11, principally in width direction. The bubble member 26, when viewed in section as in FIG. 3, comprises a generally U-shaped portion 27 and a flange portion 28 extending down each side and across the bottom of the bubble member 26. The flange portions 28 of the bubble member 26 are secured to the backing member 25 by a solvent sealing technique, in that both the bubble member 26 and the backing member 25 of the package 12 are of polyvinylchlorile construction, and the sealing solvent used to secure the package members together as a monolithic structure is methylene chloride. Thus, the entire construction of the package 12 is inert to common antiseptics, such as alcohol and the like, such that the elongated void 30 formed between the members 25 and 26 of the package 12 may receive and retain an antiseptic such as alcohol, in that the solvent sealing of the flange portion 28 completely around the sides and bottom of the bubble member 26 renders the elongated void 30 liquid-tight and capable of retaining a liquid such as alcohol therein.

The upper-most end of the bubble portion 26 is also of generally trapezoidal construction and forms a removable portion 31. With particular reference to FIG. 4, it is seen that sidewall portions 32 and 33 of the removable portion 31 of the bubble member 26 are engageable with corresponding sidewall portions 20 and 21 of the grip portion 17 of the thermometer 11, for seating of the thermometer grip portion 17.

The removable portion 31 is not provided with flanges for sealing of such portions to the backing member 25 of the package 12, although such may be provided, if desired. Howver, for facility in the removal of the removable portion 31 from the remainder of the bubble member 26, the removable portion 31 is not attached to the backing member 25, and is provided with a pair of slits 34 on opposite sides of the bubble member 26, whereby a user may readily initiate the tearing of the removable portion 31 from the remainder of the bubble member 26. In the alternative, a score line or the like may be provided entirely around the U-shaped portion 27 of the bubble member 26, for obtaining an even edge after separation of the removable portion 31 of the bubble member 26 from the remainder of the bubble member 26.

With particular reference to FIG. 2, there is illustrated the manner in which the thermometer 11 may be seated within the package 12, with the grip portion 17 of the thermometer 11 seated in the open end of the bubble portion 26 of the package 12, with the grip portion 17 in engagement with the free edge 35 of the bubble member 26, providing a seal and seating arrangement of the thermometer 11 within the package 12.

A hole 36 or other suitable hanging means is provided for the backing member 25, so that upon hanging of the package 12 in the vertical direction as shown, gravity forces will permit the seating of the grip portion 17 of the thermometer 11 within the upper open end of the void 30 of the package 12.

It is to be noted that, as indicated above, a frustoconical shaped grip portion may be utilized, it is equally important that the particular configuration of the upper edge of the opened package 12 conform to the surface configuration of the grip portion, in order to preclude bacteria and like agents from the interior the void 30 of the thermometer package 12, and to effectively provide an antiseptic seal therefor.

Furthermore, it is important that the material of construction of the package 12 as well as the coating 16 of the thermometer 11 be chemically inert to ordinary antiseptics, and the materials disclosed herein have been selected accordingly.

It will be understood by those skilled in the thermometer art that various modifications can be made in the materials of construction and manufacturing techniques of the thermometer and package of this invention, all within the spirit and scope of the invention.

What is claimed is:

1. A thermometer structure comprising an elongated tubular member having an elongated capillary tube portion therein, said tube portion terminating at one end in a bulb, said bulb containing a temperature responsive substance for longitudinal expansion in the tube portion, said tubular member having end protection means comprising a single protrusion member extending laterally of said tube portion and comprising a resilient grip portion of substantially larger transverse cross-sectional size than the transverse cross-sectional size of said tubular member, covering one end of said tubular mmber, wherein said grip portion is of varying transverse cross-sectional size, progressing toward greatest size at a free end thereof, and said grip portion being of rubber-like material construction.

2. The thermometer structure of claim 1, wherein at least two side surfaces of said grip portion are sloped.

3. The thermometer structure of claim 1, wherein a transparent coating is provided, adhered to the tubular member.

4. The thermometer structure of claim 3, wherein said coating is silicone rubber.

References Cited

UNITED STATES PATENTS

| 738,960 | 9/1903 | Vaughan et al. | 206—16.5 |
| 1,947,175 | 2/1934 | Schneider | 73—374 |
| 2,677,965 | 5/1954 | Saffir | 73—374 |
| 2,651,203 | 9/1953 | Lamb | 73—374 |

OTHER REFERENCES

Product Engineering, "Silicon Materials," April 1946, pp. 304–307.

LOUIS R. PRINCE, Primary Examiner

W. A. HENRY II, Assistant Examiner

U.S. Cl. X.R.

206—16.5